UNITED STATES PATENT OFFICE.

JACOB REESE, OF PITTSBURG, PENNSYLVANIA.

METHOD OF MAKING LIME BRICK.

SPECIFICATION forming part of Letters Patent No. 247,271, dated September 20, 1881.

Application filed August 17, 1881. (No specimens.)

*To all whom it may concern:*

Be it known that I, JACOB REESE, a citizen of the United States, residing in the city of Pittsburg, county of Allegheny, and State of Pennsylvania, have invented a new and useful Improved Method of Making Lime Brick; and I do hereby declare the following to be a full, clear, and exact specification thereof.

The object of this invention is the production of a dense, hard, and indurated brick, which is composed more largely of the oxide of calcium than any lime brick heretofore produced.

Lime brick have been made by admixing burned lime with carbonaceous matter; but as I have found that the presence of carbon reduces the fusion-point of lime and tends to leave the brick more porous than when it is not present, I desire to avoid its use in the composition of lime brick. Lime has also been admixed with silica, moistened with water, formed into brick, and burned at a high temperature; but in this case all of the lime used must needs be formed into a silicate of lime before a solid brick can be secured, which requires so large a proportion of silica as to be objectionable, as it makes the brick more fusible and retards the elimination of phosphorous in the basic process, which my improved lime brick is designed to be used in.

I have discovered that when lime is burned at a very high heat it becomes indurated to that degree as to be impervious to water, and does not slake, as lime does when burned in the ordinary manner; and this invention consists in burning lime in a cupola at an exceedingly high temperature, and then grinding the fritted mass into a state such as fire-clay is ground and prepared for fire-brick.

In an adjoining vessel I place a portion of quicklime, which is admixed with finely-pulverized silica or silicious clay. This is saturated with water and agitated until ebullition ceases. After the mass is allowed to rest for a short time the principal part of the lime will settle to the bottom of the vessel, and the water will be charged with a silicate of lime. This silicate-of-lime water is then run into the ground fritted lime and admixed by grinding until the mass assumes a stiff, plastic condition, which may be molded into brick and burned in the ordinary manner. Lime brick made in this manner will shrink but little, as the material has been indurated and thoroughly shrunk before being molded. They will be dense and hard, as the silicate of lime in the water will join all the particles of the fritted lime to each other by a chemical union, and if care is taken in the selection of the lime the brick so made will contain a less percentage of silica than possible to be made without the use of other material.

The cupola used for burning the lime is lined with limestone or lime brick, and the coke used should be as pure as possible in order to keep the lime as free from silica as can be. In burning the lime I heat the cupola with coke. The limestone (which should be as free from silica as possible) is crushed and charged with coke in the proportion of four or five pounds of limestone to one pound of coke, and the cupola blown to the highest possible temperature. If the limestone is very pure it will settle down on the bottom, and may be withdrawn by removing the bottom; but if the stone is not very pure it will run out of the cupola in a sticky mass, which in either case (the fritted lime) will be so highly burned that it will not slake or decompose in water, and it will be so thoroughly indurated that it will absorb little if any moisture, and when made into brick, as before described, the brick will be hard, of a close, dense texture, will shrink but little, and will stand the highest temperature with but little waste.

One advantage of this method of making lime brick is that the material having been burned so highly before being molded into brick, the brick may be burned in an ordinary brick-kiln, and thus the expensive method of burning lime brick at high temperature is avoided.

What I claim, and wish to secure by Letters Patent, is—

1. The method of manufacturing lime brick which consists in burning and indurating lime or limestone at a high temperature, then grinding it and mixing it with water charged with silicate of lime until it assumes a plastic condition, and then molding and burning the brick in the usual manner, substantially as described.

2. As a step in the manufacture of lime brick, uniting the particles of indurated lime by the use of a fluid silicate of lime.

JACOB REESE.

Witnesses:
J. M. ROUKE,
FRANK KELLY,